United States Patent [19]

Stoutenberg

[11] 4,077,128
[45] Mar. 7, 1978

[54] COILABLE TAPE RULE
[75] Inventor: Carl Christian Stoutenberg, Avon, Conn.
[73] Assignee: The Stanley Works, New Britain, Conn.
[21] Appl. No.: 664,864
[22] Filed: Mar. 8, 1976
[51] Int. Cl.² ............................................. G01B 3/10
[52] U.S. Cl. .................................... 33/138; 242/71.1
[58] Field of Search ................. 33/137, 138, 139, 140; 242/71.1, 84.8, 52 R

[56] References Cited
U.S. PATENT DOCUMENTS

| 2,036,720 | 4/1936 | Ritter | 33/138 |
| 2,048,969 | 7/1936 | Ritter | 33/138 |
| 2,158,024 | 5/1939 | Stowell | 33/138 |
| 2,230,668 | 2/1941 | Ohrtmann | 33/138 |
| 3,718,301 | 2/1973 | Morton | 242/197 |

Primary Examiner—Harry N. Haroian
Attorney, Agent, or Firm—Prutaman, Hayes, Kalb & Chilton

[57] ABSTRACT

A coilable tape rule having a slotted casing and a removable tape blade adapted to be coiled therein. A resiliently mounted, longitudinally slidable arcuate shoe is mounted within the casing to guide the inner end of the measuring tape for coiling on itself to form a plurality of stacked convolutions of generally elliptical shape having its major axis in a direction which is generally perpendicular to the extending portion of the tape blade when the coiling begins. As successive convolutions are formed, the shape of the stacked convolutions will gradually change to a circle and finally change back to an elliptical shape with its major axis parallel to the previously extended tape.

5 Claims, 4 Drawing Figures

COILABLE TAPE RULE

This invention relates to measuring tapes of the type suited for layout work and having a casing providing a hollow chamber in which the tape blade is adapted to be coiled for storage in a stack of convolutions with each convolution being wrapped around the preceeding convolution. The tape blade which may be fully removed from the casing, is in the form of a wide strip of metal having a concavo-convex cross-section so that it will resist bending and will, when extended, automatically assume a rectilinear state which it will maintain when supported horizontally from one end. When fully or partially coiled within the casing, the outer convolution of the coiled portion of the tape blade is inherently biased against the peripheral walls of the chamber to provide a frictional force for retaining the coiled portion of the tape blade in the state of quiescence against coiling and uncoiling.

The principal object of this invention is to provide a storage chamber of simple design for storing such a tape blade so that it may be completely coiled into the casing with a smooth, easy and relatively uniform thrust or push on the projecting straight portion of the tape blade. Included in this object is a provision of a chamber constructed so that the tape blade is initially coiled in a generally elliptical shape having its major axis perpendicular to the extended portion of the tape blade and then shifts to a position parallel to the extended portion of the tape blade as successive convolutions are added around the coiled portion of the tape blade to enlarge the peripheral length of the coiled portion as the tape blade becomes fully stored within the chamber.

Another object of this invention is to provide a casing having an improved storage chamber with a movable back wall opposite the slot forming the mouth for the entry of the tape blade into the casing which is spring biased toward the mouth of the casing and is rectilinearly slidable relative thereto. Included in this object is the provision of a biasing spring which is offset from the center line of the storage chamber so as to cause the guide shoe to tilt toward the mouth of the casing when the casing is empty.

Other objects will be in part obvious and in part pointed out more in detail hereinafter.

A better understanding of the invention will be obtained from the following detailed description and the accompanying drawings of an illustrative application of the invention.

Figure 1:
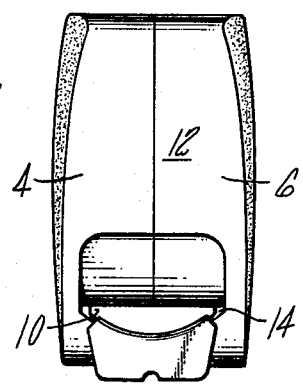
FIG. 1 is a front view of a tape blade constructed in accordance with the present invention.
Figure 2:
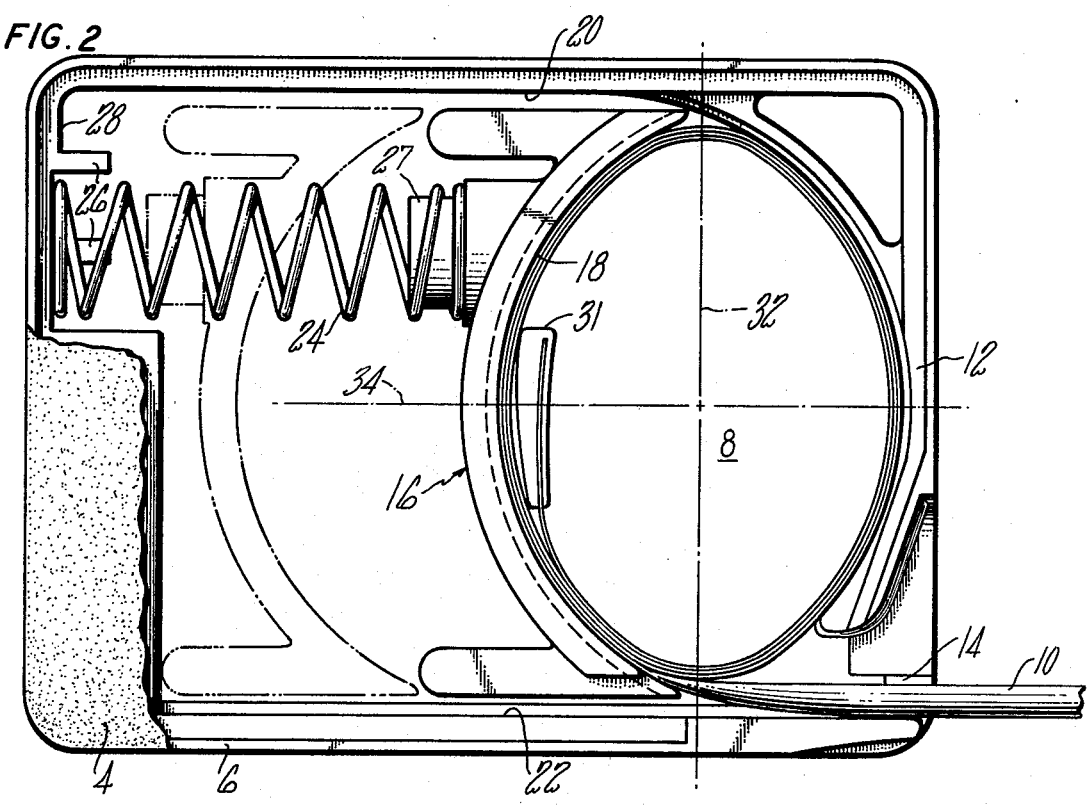
FIG. 2 is an enlarged side view partly broken away showing the tape blade almost completely withdrawn.
Figures 3, 4:
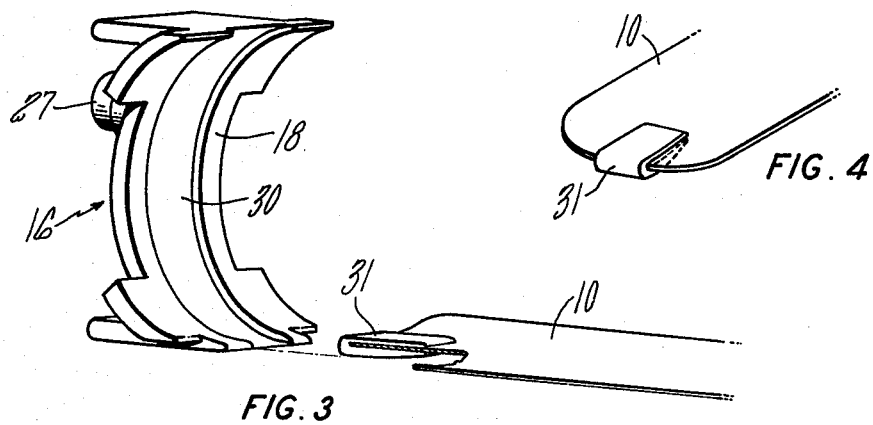
FIG. 3 is a fragmentary perspective view showing the details of the guide shoe and the cooperating end of the tape blade.
FIG. 4 is a fragmentary perspective view of an end of the tape blade.

Referring to the drawings in detail, FIGS. 1 and 2 illustrate a coilable tape blade embodying the present invention shown as comprising a casing formed of a pair of substantially identical casing halves 4 and 6 joined together to define an expandable chamber 8 for storing the tape blade 10, shown as being of the concavo-convex type that will resist bending and will, when extended automatically assume a rectilinear state. The front wall 12 of the casing is provided with an arcuate interior shape with a slot 14 forming a mouth for receiving the tape blade 10 located at the lower corner thereof. The chamber 8 is further defined by a guide shoe 16 having an arcuate front face 18 with substantially the same curvature as that of the interior of front wall 12 of the casing. The guide shoe 16 is slidably mounted on the top and bottom walls 20, 22 of the casing and is biased toward the front wall thereof by coil spring 24 which has one end positioned by locating lugs 26 adjacent the upper portion of the fixed rear wall 28 of the casing diagonally opposite from the mouth 14 in the front wall of the casing. The other end of the spring 24 is mounted by a boss 27 formed integrally with the guide shoe 16 to position the spring offset from and above the longitudinal center line of chamber 8.

As indicated above, the tape blade 10 may be completely removed from the casing for convenience in its use for layout work. To store the tape blade within the casing, the inner end of the tape blade is inserted through the entrance slot 14 until the end cap 31 secured on the inner end thereof engages guide shoe 16. End cap 31 is preferably formed of a plastics material and is disposed along the center line of the tape blade.

The guide shoe 16 is provided with centrally disposed guide chute 30 which receives the end cap 31 for guiding the same along the arcuate front face thereof. The biasing spring 24 has sufficient force to resist the backward movement of the guide shoe 16 so that the rule begins to coil with the guide shoe in its forward most position as indicated in FIG. 2. At this time, the guide shoe 16 is biased against the front wall 12 of the casing to form a generally elliptical shape having a major axis disposed in a position generally perpendicular to the straight extended portion of the tape blade and parallel to the front wall of the casing.

Any vertical clearance between the guide shoe 16 and the top and bottom walls 20, 22 respectively will result in the top of guide shoe 16 being tilted forward so as to minimize the straight line distance between the top edge of the guide shoe and the entrance slot 14.

As an increasing length of the tape blade enters the chamber 8, the end cap will follow the contour of the arcuate front face of the guide shoe and be laterally centered thereon to prevent the inner end of the tape blade from contacting the side walls of the casing. As the number of convolutions coiled within the casing increases, the peripheral length of the coiled portion also gradually increases and the guide shoe is moved under the manual thrust of coiling the tape blade within the casing toward the back wall to expand the chamber 8 and lengthen the effective peripheral wall of the coiled portion.

As more convolutions are stacked within the chamber, the coiled portion of the tape blade will eventually assume a circular shape, preferably when approximately half the tape blade has entered the casing. Thereafter, the increasing number of convolutions will cause the coiled portion to assume a second generally elliptical shape having its major axis 34 perpendicular to the initial major axis 32 of the coiled portion of the tape blade and this new major axis will gradually lengthen until the entire tape blade is stored within the casing.

Because of the shift in the major axis of the tape blade from one direction to another direction perpendicular thereto, the coiled portion of the tape blade never becomes an oblong shape wherein there is sliding contact between the straight sides of the coiled portion of the tape blade and a substantial length of the upper and lower walls 20, 22 of the casing thereby to impose a heavy frictional force resisting or preventing further coiling of the tape blade. Rather, the contact between the tape blade and the fixed side walls 20, 22 of the chamber 8 is essentially line contact until the tape blade is fully stored in the casing to produce a substantially uniform and low level of frictional resistance as the tape blade is coiled into the casing, thus insuring smooth action.

As will be apparent to persons skilled in the art, various modifications, adaptations and variations of the foregoing specific disclosure can be made without departing from the teaching of the present invention.

I claim:

1. A coilable tape rule comprising a casing providing an expandable chamber, and a removable metal tape blade therein, said tape having a concavo-convex cross-section and of the type having a strong force compelling it to assume a straight line position the front wall of said casing having a slot for receiving said tape blade and providing an arcuate inner surface, a guide shoe mounted in said casing for sliding movement toward and away from said arcuate inner surface, said guide shoe presenting an arcuate surface of substantially the same curvature as said inner surface of said front wall biasing means for urging said guide shoe toward said inner surface to a first position to a generally elliptical chamber having its major axis in a first direction to coil the initial convolution of the tape blade stored in said chamber into a corresponding first elliptical shape, said guide shoe being movable away from said front wall a sufficient distance to a second position as the tape blade is being coiled into said chamber to convert said chamber into an elliptical chamber having its major axis substantially perpendicular to said first direction.

2. The coilable tape rule of claim 1 wherein said slot is adjacent one end of said front wall and said biasing means applies a biasing force having an axis on the opposite side of a center line of said chamber perpendicular to said front wall.

3. The coilable tape rule of claim 1 wherein said guide shoe has a guide chute in said arcuate surface thereof, and an end cap provided on the inner end of said tape blade is received in said guide chute as the tape blade is coiled into said chamber for storage.

4. The coilable tape rule of claim 3 wherein said slot is adjacent one end of said front wall and said biasing means is on the opposite side of a center line of said chamber perpendicular to said front wall.

5. The coilable tape rule of claim 1 wherein the chamber is converted when approximately one-half of the tape blade is stored therein.

* * * * *

UNITED STATES PATENT AND TRADEMARK OFFICE
CERTIFICATE OF CORRECTION

PATENT NO. : 4,077,128
DATED : March 7, 1978
INVENTOR(S) : Carl Christian Stoutenberg It is certified that error appears in the above—identified patent and that said Letters Patent are hereby corrected as shown below:

Column 4, line 1, insert --define-- after "to" (second occurrence).

*Signed and Sealed this*

*Eighteenth* Day of *September 1979*

[SEAL]

Attest:

LUTRELLE F. PARKER
*Attesting Officer*  *Acting Commissioner of Patents and Trademarks*